Aug. 22, 1939.    J. S. SHARPE    2,170,733
MECHANICAL MOVEMENT
Filed Aug. 10, 1937    4 Sheets-Sheet 1

Inventor:-
John S. Sharpe
by his Attorneys
Howson & Howson

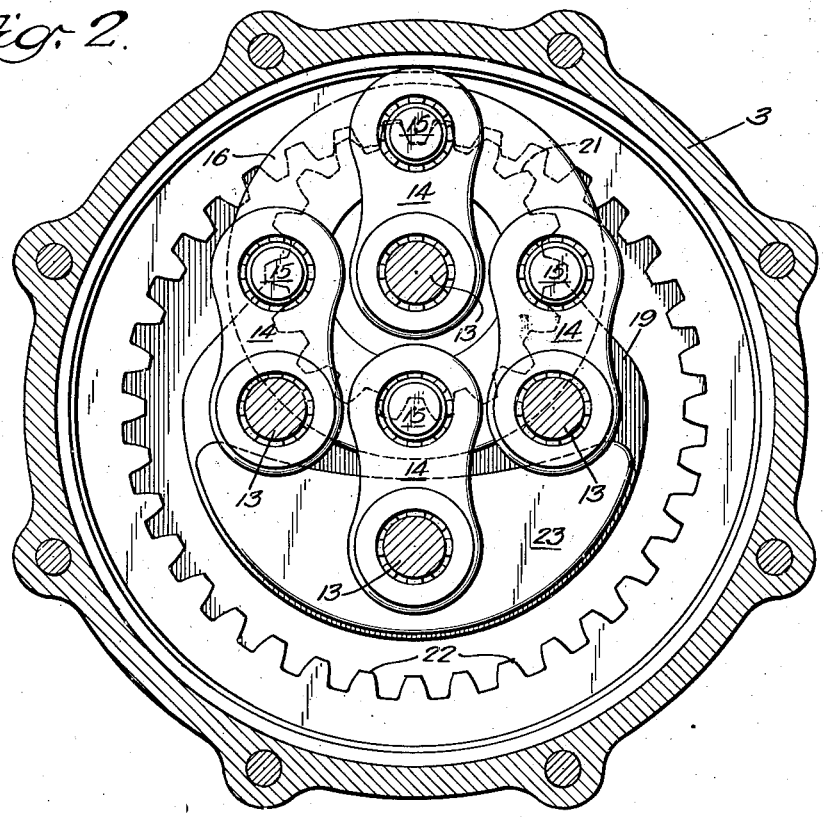

Aug. 22, 1939.   J. S. SHARPE   2,170,733
MECHANICAL MOVEMENT
Filed Aug. 10, 1937        4 Sheets-Sheet 3

Inventor:
John S. Sharpe
by his Attorneys
Howson & Howson

Patented Aug. 22, 1939

2,170,733

UNITED STATES PATENT OFFICE 2,170,733

MECHANICAL MOVEMENT

John S. Sharpe, Haverford, Pa.

Application August 10, 1937, Serial No. 158,408

32 Claims. (Cl. 74—298)

A principal object of this invention is to provide a novel mechanical movement which by reason of certain inherent characteristics may be found useful for numerous practical purposes, said characteristics and some of the specific applications of the movement being hereinafter set forth.

A primary utility of the movement appears to reside in its application to power transmission devices, and application of the movement in this field of mechanics makes possible the production of a variety of transmission devices of novel and improved characteristics.

Another object of the invention, therefore, is to provide certain novel and improved power transmission devices, as hereinafter described.

In the attached drawings:

Fig. 2 is a section on the line 2—2, Fig. 1;

Figure 5:
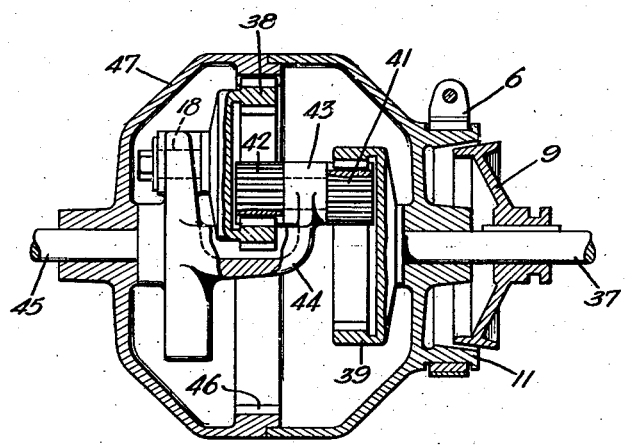
Figure 6:
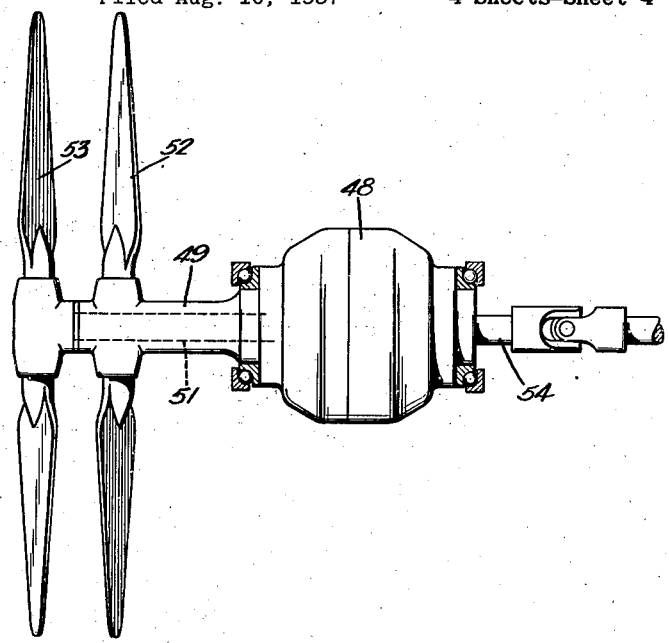
Figure 7:
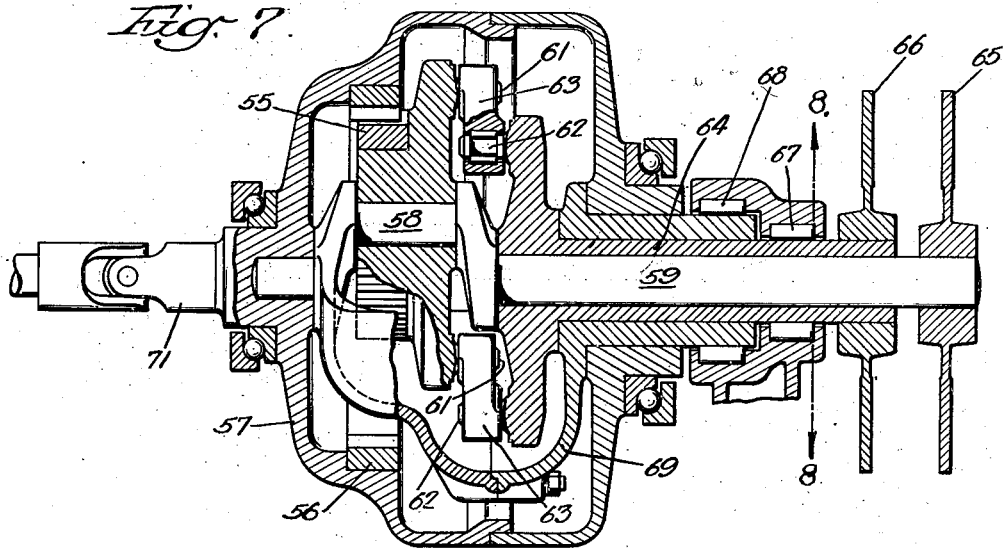
Figure 8:
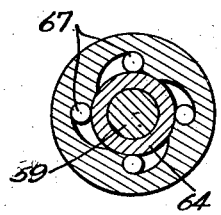

Figs. 3 to 7, inclusive, are diagrammatic views illustrating other modifications and applications of the mechanical movement, and Fig. 8 is a section on the line 8—8, Fig. 7.

Figure 1:
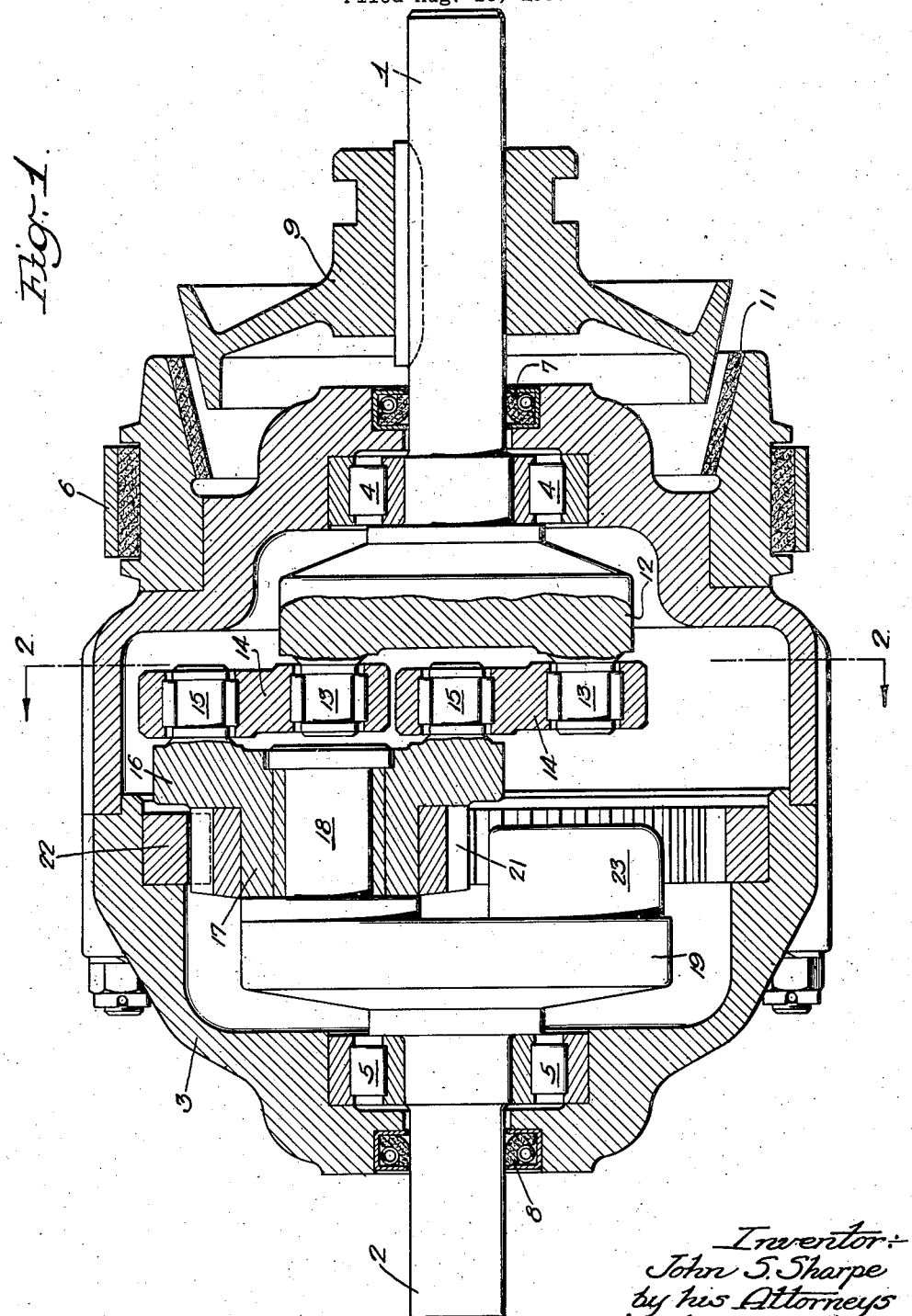
Figure 1 is a longitudinal sectional view of a reversing gear unit of improved characteristics incorporating my mechanical movement.

In the transmission mechanism illustrated in Figs. 1 and 2 of the drawings, either of the shafts 1 or 2 may constitute the power input element of the unit, but for the purpose of this description, the shaft 1 may be considered as the driving shaft. The shafts 1 and 2, as shown, are in axial alignment, and the proximate ends of the shafts are embraced by a casing 3, which through the medium of anti-friction bearings 4 and 5 is journaled in effect on the said shafts 1 and 2. This casing is adapted under certain conditions hereinafter described to rotate with the shafts 1 and 2 as a unit, and it is apparent also that the shafts may rotate independently of the casing, means being provided, in the form in the present instance of a friction band 6, for releasably holding the casing stationary. The casing 3, which is adapted to contain a lubricant, is sealed where the shafts 1 and 2 pass therethrough by suitable packings 7 and 8.

The shaft 1 has keyed or splined thereto one element 9 of a clutch, the other element of which is formed at 11 on the casing 3, and when the element 9 is engaged with the element 11, which may be accomplished by sliding the element 9 toward the casing, the said casing is joined to the shaft 1 so as to rotate with the shaft as a unit. Any conventional means (not shown) may be utilized to apply and release the friction band 6 to and from the casing, and to adjust the clutch element 9 into and out of engagement with the element 11. Normally, the band 6 will be engaged with the casing only when the clutch element 9 is released, and vice versa, and both the band 6 and the element 9 may be released simultaneously.

The inner end of the shaft 1 which occupies the interior of the casing 3 carries a flange or spider 12, from the inner face of which projects a series of cranks 13. These cranks are four in number in the present instance, although three or more may be used, and are uniformly spaced from each other and radially from the axis of the shaft 1. The cranks 13 are respectively connected by links 14, 14 with a corresponding series of cranks 15 projecting from the inner face of a flange 16 of a pinion-supporting member 17, and this member 17 is mounted for rotation on a journal pin 18 projecting from a flange 19 on the inner end of the shaft 2, it being noted that the pin 18 is parallel to the common axis of the shafts 1 and 2, and that the axis of the pin is radially offset from the said shaft axis. The member 17 has fixed thereto a toothed pinion 21 which meshes with an internal gear 22 fixed in the casing 3 in concentricity with the shafts 1 and 2. The pinion 21 thus constitutes a planetary gear which operates in the orbit gear 22. It will be noted that in the present instance, the pitch diameter of the pinion 21 is one-half that of the internal gear 22, and that the crank pins 15 move in a rotary path about the axis of the journal pin 18, which path intersects the common axis of the shafts 1 and 2. The cranks 13 are arranged to travel in a rotary path, wherein the axes of said cranks intersect the axis of the pin 18.

The operation of the device described above is as follows: With the brake 6 and clutch element 9 disengaged rotation of the shaft 1 from the power source involves no movement of the shaft 2, and the transmission in effect is in neutral. If now the clutch 9 is engaged, thereby interlocking the shaft 1 and the casing 3, power is transmitted directly from the drive shaft 1 to the driven shaft 2, and a direct drive relation between the shafts is thus obtained. By disengaging the clutch 9 and engaging the brake band 6 with the casing, as illustrated in Fig. 1, the motion of the drive shaft 1 is transmitted through the cranks 13, the links 14, and the cranks 15 to the pinion 21, the forces thus applied to the pinion tending to cause the latter to rotate about its axis in the pin 18 in the same direction as the rotation of the shaft 1 and at the same speed. Since under these conditions the casing 3 and the internal gear 22 are held stationary, the pinion 21 will track around the orbit gear 22 in a direction reverse to its rotational movement on the journal pin 18, with the result that the shaft 2 is rotated in the opposite direction from the shaft 1 and at the same rate of speed as the latter. By transmitting power to the driven shaft through the planetary pinion 21 in this manner, an extremely favorable leverage is obtained, with the result that both in the forward and the reverse drive relations, the transmission of power may be effected through the single planetary gear without sacrifice of strength. By reason of this characteristic of the mechanism, the radial dimensions of the gear may be reduced to a minimum.

The characteristics of the mechanism are such that an extremely efficient reverse gear of extremely small size is obtained affording in both the direct and reverse drives a speed ratio of unity between the driving and driven shafts. By increasing or reducing the pitch diameter of the planetary element, it is possible to modify the speed ratio between the driving and driven shafts as required. For mechanical reasons and in order to distribute the wear occurring upon the teeth of the intermeshing gears and to increase the durability of the mechanism, it is preferred to form the pinion 21 with a pitch diameter slightly smaller or greater than one-half the pitch diameter of the internal gear. Absolute static and dynamic balance is obtained in the device through the medium of a counterweight 23 on the flange 19, said counterweight being located opposite the journal pin 18 and balancing the weight of the pinion 21 and its supporting elements. By reason of the arrangement of parts and the use of solid links 14, which operate under compression as well as tension to transmit power between the inner end of the shaft 1 and the member 16, and by reason further of the arrangement of the cranks 13 and 15 in a common radial plane, the mechanism is substantially free from unbalanced forces and couples tending towards axial misalignment of the various elements of the mechanism.

It is to be noted particularly that in the aforedescribed device the cranks 13 and 15 and the links 14 assume the function of a flexible coupling between the shaft 1 and the pinion 21, in providing for a unified rotation of these elements about the misaligned axes. At the same time, the coupling provides for the movement of the pinion 21 in its orbital path. Obviously, other types of flexible coupling might be employed in lieu of the device shown in Fig. 1, as will hereinafter be set forth, and it is possible also, as hereinafter described and without departure from the principle of the invention, to operatively connect the shaft 1 with the pinion 21, so that the rotary movements of the pinion and the shaft about their respective axes depart from unity. It is desirable, however, as a matter of simplicity and efficiency, to operatively connect the shaft with the pinion by means, such as shown in Fig. 1, in the nature of a simple flexible coupling, wherein the shaft and the pinion may rotate about their individual axes in the same direction and at the same speed.

Figure 3:
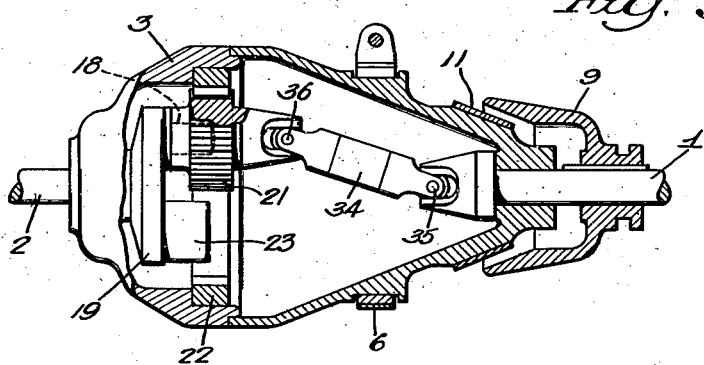

The embodiment of my invention shown in Fig. 3 is essentially the same as the embodiment illustrated in Figs. 1 and 2, and the corresponding parts of the device are identified by the same reference numerals employed in the prior embodiment. In this case, the cranks 13 and 15 and the connecting elements 14 of the prior embodiment are replaced by a simple flexible coupling consisting of a rigid link 34 and universal joints 35 and 36 which respectively connect the link 34 with the inner end of the shaft 1 and with the pinion 21.

Figure 4:
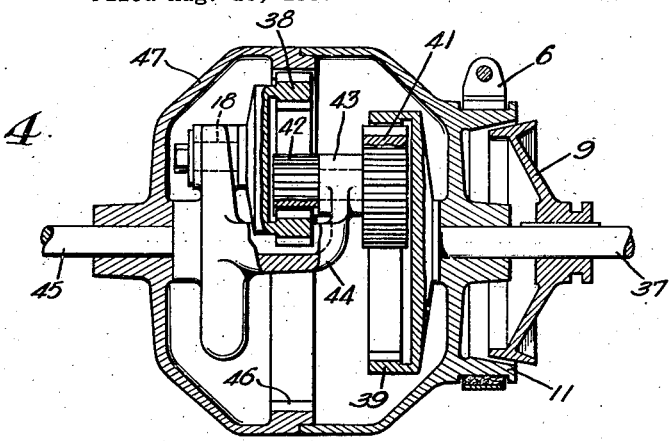

The embodiment illustrated in Fig. 4 departs from the embodiments previously described, in that toothed gearing is interpsed between the shaft 37 and the planetary gear 38 which correspond respectively to the shaft 1 and the planetary gear 21 of the embodiments of Figs. 1 and 3. In this case, the inner end of the shaft 37 is provided with an annular gear 39, and this gear meshes with a pinion 41. The pinion 41 is attached at one end of a shaft which carries at the other end a second pinion 42, and the shaft is journaled at 43 in an arm 44 which extends from the inner end of the shaft 45 which corresponds to the shaft 2 of the aforedescribed embodiments. The gear 38, which in this instance is a composite gear having both external and internal toothed elements, is also journaled, as is the planetary element of the aforedescribed embodiments, in the inner end of the shaft 45, and this composite gear 38 meshes internally with the pinion 42 and externally with an internal gear 46 in the casing 47, said internal gear 46 and the casing 47 corresponding to the internal gear 22 and the casing 3 of the embodiments shown in Figs. 1 and 3. In all other respects and in the principle of operation, the embodiment of Fig. 4 corresponds to the embodiments of Figs. 1 and 3, it being noted that the gears 39, 41, 42, 38 and 46 are so relatively proportioned that in the reverse drive, the shaft 45 will rotate at the same speed as the shaft 37, and that a rotary movement of the composite gear 38 about its axis of rotation is accompanied by a corresponding rotary movement of the shaft 37.

The embodiment illustrated in Fig. 5 is essentially the same as the embodiment of Fig. 4, and the corresponding parts are accordingly identified by the same reference numerals. The embodiment of Fig. 5 departs from the previously described embodiment in the relative sizes of the internal gear 39 and the pinion 41. In this case, therefore, the reverse rotational speed of the shaft 45 will be less than the simultaneous forward rotary speed of the shaft 37. This embodiment illustrates the fact that the relative speeds of the shafts may be varied by modification of the gearing without departing from the basic principle of the mechanical movement which forms the subject of the invention.

In Fig. 6, I have illustrated a different application of my mechanical movement. In this case, the brake 6 and clutch 9—11 of the previously described embodiments are eliminated, and the casing 48, which corresponds to the casings 3 and 47 of the previously described embodiments, is extended at 49 in the form of a shaft embracing and coaxial with the shaft 51 which corresponds to the shafts 2 and 45 previously described. Each of the shafts 49 and 51 carries a propeller 52 and 53 respectively. In all other respects, the mechanism may correspond to the embodiments illustrated in Figs. 1, 3 and 4. When with this arrangement the shaft 54 corresponding to the shafts 1 and 37 of the prior embodiments is rotated, there will occur a simultaneous but reverse rotation of the shafts 49 and 51 and of the propellers 52 and 53. The propellers 52 and 53 in the present instance are constructed so that when thus reversely rotated, they propel air in the same direction. This application of my invention is useful in aircraft for neutralizing the unbalanced torque and gyroscopic effect of the conventional single propeller drive.

Fig. 7 illustrates the application of my invention to a transmission mechanism of the variable speed type. This device corresponds in essential respects to the embodiment of my invention disclosed in Fig. 1. In this case, however, the planetary pinion 55 which meshes with the internal gear 56 in the casing 57 is mounted for rotation upon a crank 58 formed at the inner end of a shaft 59, and the pinion 55 in effect is coupled through the medium of crank pins 61 and 62 and rigid links 63 to the inner end of a shaft 64 which is coaxial with and embraces the shaft 59. Each of the shafts 59 and 64 is provided with a clutch 65 and 66 respectively whereby these shafts may be individually or jointly connected to a source of power (not shown). Associated with the shaft 64 is an overrunning clutch device 67, the character of which is illustrated in Fig. 8. This device permits rotation of the shaft 64 in one direction only. A corresponding overrunning clutch 68 is associated with the shaft 59 through an extension 69 of that shaft, and this device permits rotation of the shaft 59 in the same direction as the shaft 64, but prevents rotation in the reverse direction. As in the embodiment of Fig. 6, the casing 57 in the present instance is provided with a shaft extension 71 which is coaxial with the shafts 59 and 64.

If now the two clutches 65 and 66 are connected simultaneously with the source of power, the entire mechanism will rotate as a unit, and the shaft 71 will be operated in the same direction and at the same speed as the shafts 59 and 64. If the clutch 66 is connected to the source of power and the clutch 65 released, there will be a tendency for the planetary pinion 55 to rotate about its axis in the same direction as the shaft 64 and to move in its orbit in the reverse direction. This reverse orbital movement of the pinion 55 is prevented by the overrunning clutch 68 which is associated as previously described with the shaft 59. As a result, the axis of the pinion 55 will remain stationary, and the rotation of this pinion about its axis will result in a rotary movement of the casing 57 and of the shaft 71 in the same direction as the shaft 64 but at a reduced speed approximately two-thirds that of the shaft 64. Again, if the clutch 65 is engaged and the clutch 66 released, the pinion 55 will be carried in an orbital path by movement of the crank 58. This orbital movement of the pinion 55, assuming a load to be imposed upon the shaft 71, will tend through the cranks 61 and 62 and link 63 to rotate the shaft 64 in a reverse direction. This reverse rotation of the shaft 64, however, is prevented as previously described by the overrunning clutch device 67, with the result that a positive torque will be imposed through the pinion 55 upon the internal gear 56, and through this gear upon the casing 57 and the shaft 71, rotating the shaft 71 in the same direction as the shaft 59 but at a still further speed reduction, the shaft 71 in this case turning approximately one-third the speed of the shaft 59.

I claim:

1. A mechanical movement comprising coaxial shafts; a planetary assembly comprising an orbital member concentric with the shaft axis, and a coacting planetary member journaled on one of said shafts, and constant-torque coupling means for connecting the other of the shafts to the planetary member for joint rotation of said shaft and member about their respective axes in the same direction and at the same speed, said coupling means being flexible to compensate the misalignment of said axes and to permit the orbital movement of the planetary member.

2. A mechanical movement comprising coaxial shafts; a planetary assembly comprising a relatively fixed orbital member concentric with the shaft axis, and a coacting planetary member journaled on one of said shafts; and constant-torque coupling means for connecting the other of said shafts to the planetary member for joint rotation of said shaft and member about their respective axes in the same direction and at the same speed, said coupling means being flexible to compensate the misalignment of said axes and to permit the orbital movement of the planetary member.

3. A mechanical movement comprising coaxial shafts; a planetary assembly comprising an orbital member concentric with and mounted for rotation about the shaft axis, and a coacting planetary member journaled on one of said shafts; and constant-torque coupling means for connecting the other of the shaft to the planetary member for joint rotation of said shaft and member about the respective axes in the same direction and at the same speed, said coupling means being flexible to compensate the misalignment of said axes and to permit the orbital movement of the planetary member.

4. A mechanical movement comprising coaxial shafts; a planetary assembly comprising an orbital member concentric with and mounted for rotation about the shaft axis, and a coacting planetary member journaled on one of said shafts; means for coupling the other of the shafts to the planetary member for joint rotation of said shaft and member about the respective axes in the same direction, said coupling means being flexible to compensate the misalignment of said axes and to permit the orbital movement of the planetary member; and selectively operative means for connecting the said orbital member to one of the shafts for rotation with the latter and for immobilizing said orbital member against movement with the shafts.

5. A mechanical movement comprising a shaft; a rotary internal gear coaxial with the shaft; a composite pinion journaled for rotation about an axis radially removed from the axis of said shaft and meshing externally with said internal gear, said pinion being movable in the orbital path defined by said internal gear; a pinion meshing with the internal component of said composite pinion and being journaled for rotation about an axis fixed with respect to the rotary axis of said composite pinion and radially removed with respect to the said shaft axis; a third pinion journaled for rotation about the axis of the second-named pinion and relatively fixed with respect to the latter; and an internal gear on said shaft meshing with said third pinion.

6. A mechanical movement comprising a pair of coaxial shafts; a rotary internal gear coaxial with said shafts; a pinion meshing with the internal gear and journaled for rotation on one of said shafts about an axis radially offset from the shaft axis, said pinion being movable in an orbital path defined by said internal gear; and constant-torque transmission means for operatively connecting the other of said shafts with the pinion so that rotation of said pinion about its axis is accompanied by a corresponding rotation in the same direction of said operatively connected shaft.

7. In transmission mechanism, the combination with coaxial shafts; of an internal gear concentric with the common axis of said shafts and mounted for rotation about said axis; a pinion journaled on one of said shafts for rotation about an axis parallel to and radially offset from the axis of said shaft, said pinion meshing with the said internal gear and forming with the latter a planetary assembly; means for releasably immobilizing the internal gear; means for operatively connecting the other of said shafts with the planetary pinion so that rotation of said pinion about its axis is accompanied by a rotation in the same direction of the operatively connected shaft; and means for releasably connecting the internal gear with one of said shafts for rotation with the latter.

8. In transmission mechanism, the combination with coaxial shafts; of an internal gear concentric with the common axis of said shafts and mounted for rotation about said axis; a pinion journaled on one of said shafts for rotation about an axis parallel to and radially offset from the axis of said shaft, said pinion meshing with the internal gear and forming with the latter a planetary assembly; means for releasably immobilizing said planetary gear; means for operatively connecting the other of said shafts with the planetary pinion so that rotation of either of said shafts while the internal gear is immobilized is accompanied by a planetary movement of the pinion together with a rotary movement of the other of said shafts in the same direction as the rotary movement of the pinion about its axis; and releasable means for connecting said internal gear with one of said shafts for rotation as a unit with the latter.

9. In transmission mechanism, the combination with coaxial shafts; of a planetary assembly comprising an orbital member concentric with the axis of said shafts and mounted for rotation about said axis, and a planetary member journaled on one of said shafts; and means for operatively connecting the other of said shafts with the planetary member so that a rotary movement of said member about its axis is accompanied by a rotary movement of said shaft in the same direction, said connecting means providing also for the orbital movement of said member; releasable means for immobilizing the orbital member whereby rotation of either of the shafts may effect rotation of the other shaft in the reverse direction; and means for releasably interconnecting the orbital member with one of the shafts for rotation with both of the shafts as a unit.

10. In transmission mechanism, the combination with coaxial shafts; of a planetary member journaled for rotation on one of said shafts on an axis parallel to but radially offset from the shaft axis; constant-torque transmission means for operatively connecting the other of said shafts with said planetary member so that a rotary movement of said member about its axis is accompanied by a rotary movement of said shaft in the same direction, said connecting means providing also for an orbital movement of said member; and a member mounted for rotation about the common axis of said shafts and comprising an orbital member concentric with the shaft axis and adapted to coact with the planetary member to form a planetary assembly.

11. In transmission mechanism, the combination with coaxial shafts; of a planetary member journaled for rotation on one of said shafts on an axis parallel to but radially offset from the shaft axis; means for operatively connecting the other of said shafts with said planetary member so that a rotary movement of said member about its axis is accompanied by a rotary movement of said shaft in the same direction, said connecting means providing also for orbital movement of said member; a member mounted for rotation about the common axis of said shafts and comprising an orbital member concentric with the shaft axis and adapted to coact with the planetary member to form a planetary assembly; releasable means for immobilizing said rotary member whereby rotation of either of the shafts may effect rotation of the other shaft in the reverse direction; and means for releasably interconnecting said rotary member with one of the shafts for rotation with both of the shafts as a unit.

12. In transmission mechanism, the combination with coaxial shafts; of a planetary member journaled for rotation on one of said shafts on an axis parallel to but radially offset from the shaft axis; constant-torque transmission means for operatively connecting the other of said shafts with said planetary member so that a rotary movement of said member about its axis is accompanied by a rotary movement of said shaft of the same extent and in the same direction, said connecting means providing also for orbital movement of said member; a member mounted for rotation about the common axis of said shafts and comprising an orbital member concentric with the shaft axis and adapted for coaction with the planetary member to form a planetary assembly, said mechanism being operative to deliver torques through one of said shafts to the other of said shafts and said rotary member, respectively, tending to rotate the last-named shaft and said rotary member in opposite directions.

13. In transmission mechanism, the combination with coaxial shafts; of a casing embracing the proximate ends of said shafts and adapted for rotation about the common axis of the latter; a planetary assembly comprising an orbital member secured in said casing, and a planetary member journaled on one of said shafts for rotation about an axis parallel to and radially offset from the shaft axis; constant-torque transmission means for operatively connecting said planetary member with the other of said shafts so that a rotary movement of said member about its axis is accompanied by a rotary movement of said shaft in the same direction, said connecting means providing also for orbital movement of said member, said mechanism being adapted to transmit torques from one of said shafts to the other of said shafts and to said casing tending simultaneously to rotate the last-named shaft and said casing in opposite directions.

14. In transmission mechanism, the combination with coaxial shafts; of a casing embracing the proximate ends of said shafts and adapted for rotation about the common axis of the latter; a planetary assembly comprising an orbital member secured in said casing, and a planetary member journaled on one of said shafts for rotation about an axis parallel to and radially offset from the shaft axis; means for operatively connecting said planetary member with the other of said shafts so that a rotary movement of said member about its axis is accompanied by a rotary movement of said shaft in the same direction, said connecting means providing also for orbital movement of said member; releasable means for immobilizing the casing whereby rotation of either of the shafts may effect rotation of the other shaft in the reverse direction; and means for releasably interconnecting the casing with one of the shafts for rotation with both of the shafts as a unit.

15. In transmission mechanism, the combination with coaxial shafts; of a casing embracing the proximate ends of said shafts and adapted for rotation about the common axis of the latter; a planetary assembly comprising an orbital member secured in said casing, and a planetary member journaled on one of said shafts for rotation about an axis parallel to and radially offset from the shaft axis; means for operatively connecting said planetary member with the other of said shafts so that a rotary movement of said member about its axis is accompanied by a rotary movement of said shaft in the same direction, said connecting means providing also for orbital movement of said member; a brake element associated with said casing and operative either to immobilize said casing or to leave the casing free for rotation about its axis; and a clutch having cooperative elements connected respectively to said casing and one of said shafts whereby said casing may be connected to said shaft for rotation with both of said shafts as a unit.

16. In transmission mechanism, the combination with coaxial shafts; of a casing embracing the proximate ends of said shafts and adapted for rotation about the shaft axis; means providing a journal between said casing and the shafts; a planetary member in the interior of said casing, said member being journaled on one of said shafts for rotation about an axis parallel to the axis of the shaft and radially offset from the latter; an orbital member carried by the casing and concentric with the shaft axis, said orbital member being operatively associated with the planetary member and forming with the latter a planetary assembly; means in said casing for operatively connecting the planetary member to the other of said shafts so that a rotary movement of said member about its axis is accompanied by a rotary movement of said shaft in the same direction, said connecting means providing also for the orbital movement of said member; a brake for immobilizing said casing and adapted when released to leave said casing free for rotation about its axis; and releasable clutch means comprising elements carried respectively by the casing and by one of said shafts whereby said casing may be interconnected with said shaft for rotation with both of said shafts as a unit.

17. In transmission mechanism, the combination with coaxial shafts; of a planetary assembly comprising an orbital member concentric with the axis of said shafts and mounted for rotation about said axis, and a planetary member journaled on one of said shafts, said orbital member having an effective diameter equal to twice the effective diameter of said planetary member; constant-torque transmission means for operatively connecting the other of said shafts with the planetary member so that a rotary movement of said member about its axis is accompanied by a corresponding rotation of said shaft to the same extent and in the same direction, said connecting means providing also for orbital movement of said member, said mechanism being adapted to transmit torques through one of said shafts simultaneously to the other of said shafts and to the orbital member tending to rotate said shaft and member in opposite directions.

18. In transmission mechanism, the combination with coaxial shafts; of a planetary assembly comprising an orbital member concentric with the axis of said shafts and mounted for rotation about said axis, and a planetary member journaled on one of said shafts, said orbital member having an effective diameter equal approximately to twice the effective diameter of said planetary member; means for operatively connecting the other of said shafts with the planetary member so that a rotary movement of said member about its axis is accompanied by a corresponding rotation of said shaft in the same direction, said connecting means providing also for the orbital movement of said member, releasable means for immobilizing the orbital member whereby rotation of either of the shafts may effect a rotation of the other shaft in the reverse direction and approximately at the same speed; and means for releasably interconnecting the orbital member with one of the shafts for rotation with both of the shafts as a unit.

19. In transmission mechanism, the combination with coaxial shafts; of a planetary assembly comprising an orbital member concentric with the axis of said shafts and mounted for rotation about said axis, and a planetary member journaled on one of said shafts; a plurality of cranks on the other of said shafts arranged in annular series around the axis of said shafts; a corresponding number of cranks on said planetary member similarly arranged with respect to the rotary axis of that member; rigid members connecting the cranks of the respective series in pairs whereby a rotary movement of said planetary member about its axis is accompanied by a corresponding rotation of said shaft in the same direction, and whereby further said planetary member is permitted to move in its orbital path, said mechanism being adapted to transmit torques from one of said shafts simultaneously to the other of said shafts and to said orbital member tending to rotate said shaft and member in opposite directions.

20. In transmission mechanism, the combination with coaxial shafts; of a planetary assembly comprising an orbital member concentric with the axis of said shafts and mounted for rotation about said axis, and a planetary member journaled on one of said shafts; a plurality of cranks on the other of said shafts arranged in annular series around the axis of said shafts; a corresponding number of cranks on said planetary member similarly arranged with respect to the rotary axis of that member; rigid members connecting the cranks of the respective series in pairs whereby a rotary movement of said planetary member about its axis is accompanied by a rotary movement of said shaft in the same direction, and whereby further said planetary member is permitted to move in its orbital path; releasable means for immobilizing the orbital member whereby rotation of either of the shafts may effect rotation of the other shaft in the reverse direction; and means for releasably interconnecting the orbital member with one of the shafts for rotation with both of the shafts as a unit.

21. In transmission mechanism, the combination with coaxial shafts; of a planetary assembly comprising an orbital member concentric with the axis of said shafts and mounted for rotation about said axis, and a planetary member journaled on one of said shafts, said orbital member having an effective diameter equal to twice the effective diameter of the planetary member; a plurality of cranks on the other of said shafts arranged in an annular series at a radial distance from said shaft equal to the radial distance from said shaft axis of the rotary axis of said planetary member; a corresponding number of cranks on said planetary member arranged in annular series at a radial distance from the axis of rotation of said planetary member equal to the said effective radius of said member; and rigid elements connecting the cranks of the respective series in pairs, said mechanism being adapted to transmit torques through one of said shafts to the other of said shafts and to the planetary member, respectively, tending to rotate said shaft and member simultaneously in opposite directions.

22. In transmission mechanism, the combination with coaxial shafts; of a planetary assembly comprising an orbital member concentric with the axis of said shafts and mounted for rotation about said axis, and a planetary member journaled on one of said shafts, said orbital member having an effective diameter approximately equal to twice the effective diameter of the planetary member; a plurality of cranks on the other of said shafts arranged in an annular series at a radial distance from said shaft equal to the radial distance from said shaft axis of the rotary axis of said planetary member; a corresponding number of cranks on said planetary member arranged in annular series at a radial distance from the axis of rotation of said planetary member equal to the said effective radius of said member; rigid elements connecting the cranks of the respective series in pairs; releasable means for immobilizing the orbital member whereby rotation of either of the shafts may affect rotation of the other shaft in a reverse direction and approximately at the same speed of rotation; and means for releasably interconnecting the orbital member with one of the shafts for rotation with both of the shafts as a unit.

23. In transmission mechanism, the combination with coaxial shafts; of a planetary assembly comprising an orbital member concentric with the axis of said shafts and mounted for rotation about said axis, and a plurality of planetary members journaled on one of said shafts; means for operatively connecting the other of said shafts with the planetary members so that rotary movement of said members about their respective axes is accompanied by a rotation of said shaft in the same direction, said connecting means providing also for the orbital movement of said members; releasable means for immobilizing the orbital member whereby rotation of either of the shafts may effect rotation of the other shaft in the reverse direction; and means for releasably interconnecting the orbital member with one of the shafts for rotation with both of the shafts as a unit.

24. In transmission mechanism, the combination with a pair of coaxial propeller shafts, one embracing the other, and propellers mounted on said shafts; of a common drive shaft coaxial with said propeller shafts; an internal gear fixed to one of said propeller shafts and concentric with the axis of said shafts; a single pinion meshing with said internal gear, said pinion being journaled on the other of said propeller shafts for rotation about an axis offset radially from the axis of the shaft; and constant-torque transmission means for operatively connecting the said drive shaft with the pinion so that rotation of said pinion about its axis is accompanied by a corresponding rotation in the same direction of the said drive shaft.

25. A differential gear comprising a pair of coaxial driven shafts; a common drive shaft for said driven shafts coaxial with the latter; an internal gear fixed to one of said driven shafts and concentric with the axis of said shaft; a crank on the other of said propeller shafts; a single pinion meshing with said internal gear and journaled on said crank; and constant-torque transmission means for operatively connecting the drive shaft with the pinion so that rotation of said pinion about its axis is accompanied by a corresponding rotation in the same direction of the said drive shaft.

26. In transmission mechanism, the combination, with a pair of coaxial shafts, one embracing the other; a third shaft coaxial with said first-named shafts; an internal gear fixed to said third shaft and concentric with the latter; a pinion journaled on one of the first-named shafts for rotation about an axis offset radially from the axis of said shaft and meshing with said internal gear; means for operatively connecting said pinion with the other of said first-named shafts so that rotation of said pinion about its axis shall be accompanied by rotation in the same direction of the operatively connected shaft; means for preventing rotation of one of the first-named shafts in one direction; and means for preventing rotation of the other of said first-named shafts in the same direction, both of said first-named shafts being free for rotation in the other direction.

27. In a transmission mechanism, the combination with a plurality of coaxial shafts, of an internal gear mounted concentrically on one of said shafts, a pinion journaled on another of said shafts for rotation about an axis offset from the axis of said shafts and meshing with said internal gear, means for coupling said pinion with still another of said shafts so that rotary movement of said pinion about its axis is accompanied by a corresponding rotary movement of the shaft in the same direction, said coupling being flexible to compensate the axial misalignment of said pinion and shaft and to permit orbital movement of the pinion in the internal gear, and means for preventing rotation of each of the two last-named shafts in one and the same direction while permitting rotation thereof in the opposite direction.

28. In a transmission mechanism, the combination with an internal gear and a pinion meshing with said gear, of a pair of rotary members coaxial with said gear, one of said members comprising a journal for said pinion, means for coupling said pinion to the other of said members so that rotary movement of said pinion about its axis is accompanied by a corresponding rotary movement of the member in the same direction, said coupling being flexible to compensate the axial misalignment of said pinion and member and to permit orbital movement of the pinion in the internal gear, and means for preventing rotation of each of said members in one and the same direction while permitting rotation thereof in the opposite direction.

29. In transmission mechanism, the combination with a pair of coaxial shafts, of an internal gear carried by one of said shafts, a crank on the other of said shafts, a spur gear journaled on said crank and meshing with said internal gear, and means operative to prevent rotation of said spur gear about its axis while permitting movement thereof in the orbital path defined by said internal gear whereby rotation of the first-named shaft in a given direction may effect a rotation in the same direction of the other of said shafts at an increased rate of speed.

30. A mechanical movement consisting of a power transmission shaft and a plurality of rotary members coaxial with said shaft, a planetary assembly comprising an orbit element carried by and concentric with one of said members and a coactive planetary element journaled on said shaft, and constant-torque transmission means for coupling said planetary element to another of said rotary members for joint rotation of said element and member about their respective axes at the same rate of speed and in the same direction, said coupling means being flexible to compensate the misalignment of said axes and to permit the orbital movement of the planetary member.

31. A transmission mechanism comprising coaxial driving and driven shafts, a pinion journaled on one of said shafts on an axis radially offset from the shaft axis, means for coupling the pinion to the other of said shafts so that rotary movement of the pinion about its axis is accompanied by a corresponding rotary movement of the shaft in the same direction, said coupling being flexible to compensate the axial misalignment of said pinion and shaft and to permit orbital movement of the pinion about the shaft axis, an internal gear concentric with the shaft axis and meshing with said pinion, means for immobilizing said internal gear, said immobilizing means being releasable to permit said gear to rotate, and releasable means for immobilizing the internal gear with respect to one of said shafts to thereby effect a rotation as a unit of the shafts and said gear.

32. A mechanical movement comprising coaxial shafts, a crank on one of said shafts, a planetary assembly comprising an element concentric with the shaft axis together with a single planetary member journaled on said crank and coactive with and movable in a planetary path defined by said element, and constant-torque coupling means for connecting the other of the shafts to the said planetary member for joint rotation of said shaft and member about their respective axes in the same direction and at the same speed, said coupling means being flexible to compensate the misalignment of said axes and to permit the orbital movement of the planetary member.

JOHN S. SHARPE.